UNITED STATES PATENT OFFICE.

AUGUST STOCK AND FRIEDRICH HEIM, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DYESTUFF OF THE TRIPHENYLMETHANE SERIES AND PROCESS OF MAKING SAME.

1,042,498.  Specification of Letters Patent.  Patented Oct. 29, 1912.

No Drawing.  Application filed August 24, 1910. Serial No. 578,649.

*To all whom it may concern:*

Be it known that we, AUGUST STOCK, Ph. D., chemist, and FRIEDRICH HEIM, Ph. D., chemist, citizens of the Empire of Germany, residing at Höchst-on-the-Main, Germany, have invented certain new and useful Improvements in Dyestuffs of the Triphenylmethane Series and Processes of Making Same, of which the following is a specification.

In our U. S. patent application Ser. No. 562,977, filed on the 23rd of May, 1910, is described the manufacture of violet to blue dyestuffs, capable of being subsequently chromed, by heating with an aromatic base a coloring matter obtained in the usual manner from para-chloro-benzaldehyde and an ortho-oxyaryl-carboxylic acid.

According to our present invention there is substituted for the aforesaid coloring matter obtained in the usual manner from para-chloroben-zaldehyde and an aromatic oxy-carboxylic acid, one made in like manner from a substitution-product of parachloro-benzaldehyde, or from another parahalogen-benzaldehyde or substitution-product thereof. The dyestuffs thus obtained, which contain a residue of alphylamin instead of the halogen atom in the para position, are, on being dried and pulverized in the form of their sodium salts, dark powders, soluble in diluted caustic soda-lye with a violet color, in concentrated sulfuric acid with a reddish-yellow color, and dye wool in an acid bath violet gray tints; by subsequent treatment with a bichromate and acid, violet to blue dyeings of great fastness are obtained, which are distinguished from the dyeings obtainable by the halogenized dyestuffs described in the above-mentioned specification, chiefly by greater fastness to alkalis. They have the generic formula:

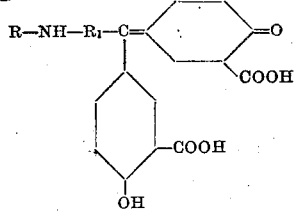

wherein "R" stands for an aryl residue and "$R_1$" for a substituted aryl residue, and wherein hydrogen atoms of the other benzene nuclei and the hydrogen atom at the nitrogen-atom may be substituted.

Example: The dyestuff obtained from 4:6-dichloro-3-toluyl-aldehyde and ortho-cresotinic acid is heated with five times its weight of anilin and one part of anilin hydrochlorid for three hours to 100° C. The product of the reaction is then poured on diluted hydrochloric acid and the precipitated dyestuff separated from the liquids by filtration.

Having now described our invention, what we claim is:

1. The process of making violet to blue dyestuffs of the triphenylmethane series, capable of being subsequently chromed, which consists in condensing a substitution-product of a para-halogenbenzaldehyde and ortho-oxy-aryl-carboxylic acid, oxidizing the product thus obtained, and finally heating the product of the reaction with an aromatic base.

2. As new products, the dyestuffs of the formula:

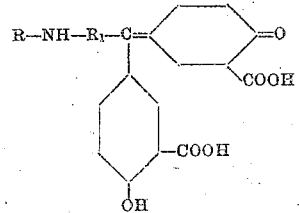

wherein "R" stands for an aryl residue and "$R_1$" for a substituted aryl residue, and wherein hydrogen atoms of the other benzene nuclei and the hydrogen atom at the nitrogen atom may be substituted; which dyestuffs are, after being dried and pulverized in the form of their sodium salts, dark powders, soluble with a violet color in diluted caustic soda lye, also soluble in concentrated sulfuric acid with a reddish-yellow color, and dyeing wool in an acid bath violet-gray tints which on being treated with a bichromate and acid turn into bright-violet to blue tints of great fastness to milling.

3. As a new product, the dyestuff of the formula:

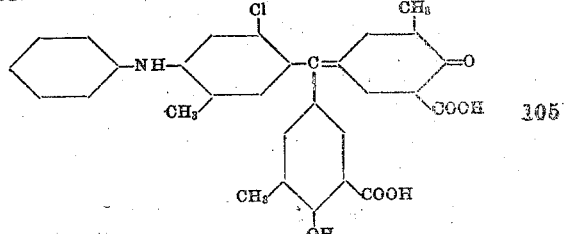

which dyestuff is, after being dried and pulverized in the form of its sodium salt, a dark powder, soluble with a violet color in diluted caustic soda lye, also soluble in concentrated sulfuric acid with a reddish-yellow color, and dyeing wool in an acid bath violet-gray tints which on being treated with a bichromate and acid turn into a bright blue tint of great fastness to milling.

In testimony whereof, we affix our signatures in presence of two witnesses.

AUGUST STOCK.
FRIEDRICH HEIM.

Witnesses:
JEAN GRUND,
CARL GRUND.